United States Patent Office 3,056,014
Patented Sept. 25, 1962

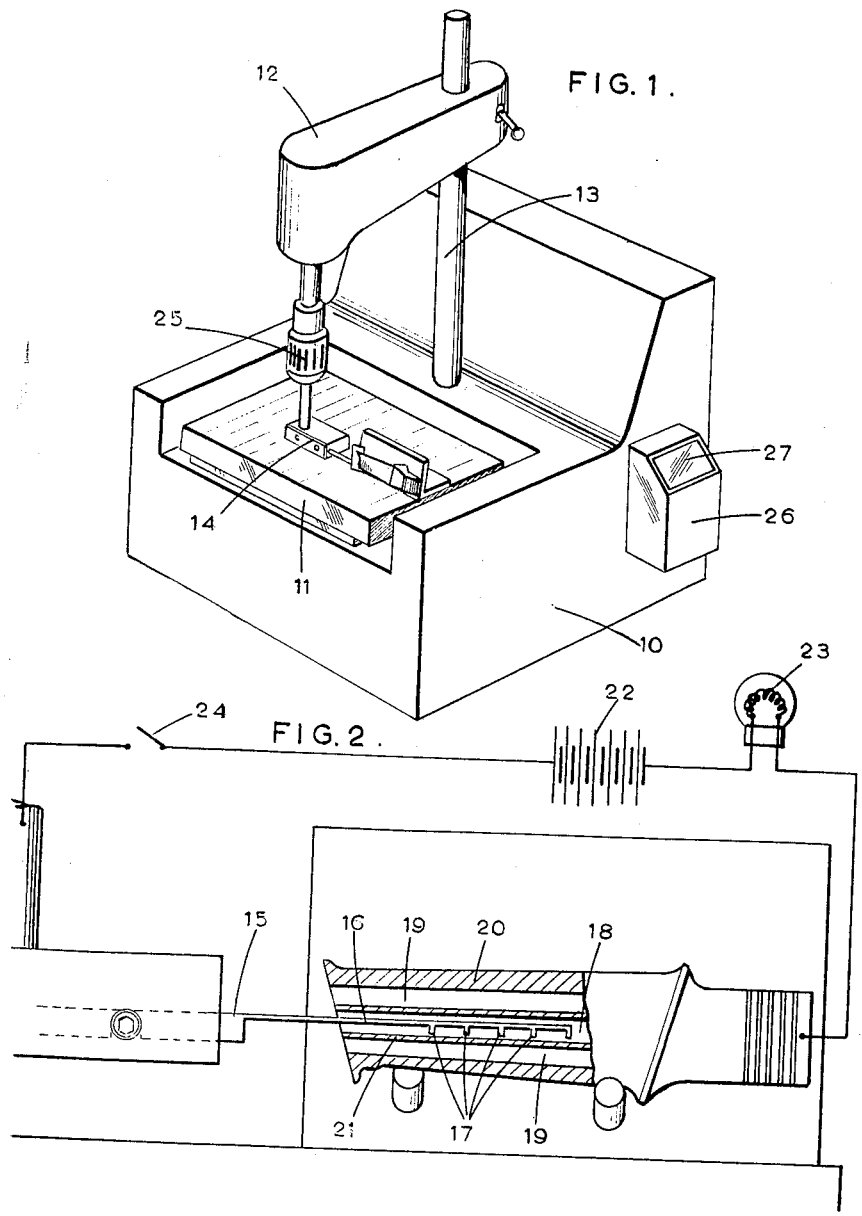

3,056,014
ELECTRO-EROSION (ALSO CALLED SPARK MACHINING)
Richard Walter Hulley and Albert Griffiths, Alvaston, England, assignors to Rolls-Royce Limited, Derby, England, a British company
Filed June 8, 1959, Ser. No. 818,939
Claims priority, application Great Britain June 18, 1958
1 Claim. (Cl. 219—69)

The present invention is concerned with the problem of forming small holes in places which are inaccessible to a drill or other machine tool, the invention being particularly useful where it is desired to form one or more small diameter holes leading from a comparatively long and small diameter boring in an object, the hole or holes lying transversely to the boring and being usually radially positioned thereof and extending through the boring wall. Such a requirement arises in the case of a blade for a gas turbine engine provided with two or more longitudinal borings for the entry and discharge of a cooling or other fluid, the borings being connected with one or more transverse holes. Such an arrangement is disclosed by the specification and drawings of co-pending British patent application No. 19564/58.

It is proposed in accordance with the present invention to form the holes by spark erosion and by inserting an electrode into the bore, the electrode having one or more lateral projections lying opposite the point or points where the hole or holes is or are to be formed in the boring wall and then applying an electrical potential between the projection or projections and the boring wall to cause sparking across the intervening gap and thereby erode the metal, the electrode and object being moved relative to each other to maintain the gap substantially constant as the depth of the hole or holes increases. A suitable dielectric fluid is introduced into the boring under pressure for example through a capillary boring in the electrode which assists in reducing the temperature of the electrode in addition to washing away the eroded metal from the hole or holes and out of the boring in which the electrode is contained.

Referring to the accompanying drawings;

FIGURE 1 is a perspective view of a machine embodying the invention; and

FIGURE 2 is a sectional view on an enlarged scale of a portion of the machine with a blade shown partly in section.

The machine shown in FIGURE 1 comprises a base 10 on which is mounted a table 11 capable of longitudinal and transverse movement relatively to a holder 12. The holder 12 is vertically adjustable on a post 13 and carries at its lower end a block 14 in which is fixed an electrode 15.

The electrode 15 has a longitudinal portion 16 and transverse tooth-like projections 17 (FIGURE 2).

Prior to setting up the machine for the erosion of the transverse internal holes, longitudinal borings 18 and 19 are drilled or otherwise formed in the blade 20, it being desired to form the transverse holes in the wall connecting boring 18 with the lower of the two borings 19.

The comb-like electrode 15 is then inserted in the boring 18 and is positioned so that it is very close to, but not quite touching the wall 21 of the bore 18.

Electric current is then applied between the electrode 15 and the blade 20 and transverse holes are eroded, in the wall 21 corresponding to the teeth 17. These holes are eroded by causing the electrode holder 25 to move downwards to effect continuous erosion of the holes whilst applying the electric current to the electrode.

The electrode 15 may be formed of copper and/or brass and may, due to erosion of the electrode, have to be replaced during the erosion operation.

The result of the operation is to form transverse holes through the wall 21 which interconnect the bore 18 with the lower bore 19, but if transverse holes are also required connecting bore 18 with the upper bore 19 the process is repeated.

The electric circuit shown in FIGURE 2 consists of a battery 22 and lamp 23 interconnected between the blade 20 and electrode 15. The lamp is provided to ensure that, during setting up of the electrode, the electrode is not touching the wall of the internal bore 18, the lamp being housed for example in a housing 26 mounted on one wall of the base 10, and having a sight window 27.

Should the electrode touch the wall of the internal bore the lamp 23 will light, thus warning the operator. A suitable separate source of electric supply is used to supply the D.C. for spark erosion. Switch 24 will be opened when the electrode has been correctly set up to take the battery and lamp out of circuit.

The electrode 15 is vibrated during the eroding operation, the vibration acting upon the electrode holder 25 (FIGURE 1) which includes an electro-magnetic vibrator so as to vibrate the electrode horizontally i.e. in the direction of the length of the projections 17. The amplitude of vibration is of the order of .001 inch.

Means may be provided (not shown) for feeding a suitable dielectric fluid into the interior of the boring to assist in the erosion of the metal, maintaining the electrode in a comparatively cool state and washing out the eroded metal from the boring as the process proceeds.

The operation takes place in a bath of paraffin or other suitable dielectric fluid.

We claim:

The method of simultaneously forming by spark erosion at least two transverse holes connecting a pair of spaced parallel borings which extend substantially longitudinally through the airfoil portion of a gas turbine engine blade, one of said borings having a diameter somewhat greater than the desired lengths of said holes, comprising inserting longitudinally into one of said borings an electrode having at least two lateral projections of substantially the size, shape and length of the desired holes until they lie opposite the points where the holes are to be formed in the boring wall without touching the latter, then applying an electric potential between the projections and the boring wall to cause sparking across the intervening gaps to thereby erode the metal, moving the electrode and blade relative to each other in the direction of said projections to maintain the gaps substantially constant as the depth of the holes so eroded increases, and vibrating the composite electrode axially of the lateral projections thereon throughout a small magnitude.

References Cited in the file of this patent
UNITED STATES PATENTS

| | | |
|---|---|---|
| 2,753,429 | McKechnie | July 3, 1956 |
| 2,765,394 | Griffith | Oct. 2, 1956 |
| 2,783,411 | Matulaitis | Feb. 26, 1957 |
| 2,902,584 | Ullmann | Sept. 1, 1959 |